United States Patent [19]

Stone

[11] Patent Number: 5,261,801
[45] Date of Patent: Nov. 16, 1993

[54] METHOD AND APPARATUS FOR DISENGAGING HYDRAULIC MOTORS

[75] Inventor: Stephen R. Stone, San Antonio, Tex.

[73] Assignee: Rineer Hydraulics, Inc., Corpus Christi, Tex.

[21] Appl. No.: 9,904

[22] Filed: Jan. 27, 1993

[51] Int. Cl.5 .............................................. F01C 21/00
[52] U.S. Cl. ........................................ 418/69; 192/96
[58] Field of Search .............. 418/69, 182; 192/96, 192/67 R; 92/29

[56] References Cited

U.S. PATENT DOCUMENTS

| | | | |
|---|---|---|---|
| 1,943,057 | 1/1934 | Bush | 192/96 |
| 4,553,914 | 11/1985 | Noell et al. | 418/69 |
| 4,599,058 | 7/1986 | Stone | 418/221 |

FOREIGN PATENT DOCUMENTS 0809016  2/1937  France ............................ 418/69

*Primary Examiner*—Edward K. Look
*Assistant Examiner*—Charles G. Freay
*Attorney, Agent, or Firm*—Fulbright & Jaworski

[57] ABSTRACT

A method and apparatus for disengaging and reengaging a hydraulic motor from the mechanism it is driving. The hydraulic motor includes a shaft that is longitudinally movable relative to the rotor. Longitudinally moving the shaft disconnects the drive mechanism from the rotor. In one embodiment the shaft is disconnected from the drive mechanism and in another embodiment the shaft is disconnected from the rotor.

13 Claims, 4 Drawing Sheets

METHOD AND APPARATUS FOR DISENGAGING HYDRAULIC MOTORS

BACKGROUND OF THE INVENTION

The present invention is directed to a method and apparatus for disengaging a hydraulic motor from its driven mechanism. In particular, the hydraulic motor includes a longitudinal movable output shaft which may be moved for allowing the driven mechanism to rotate without interference from the hydraulic motor.

In hydraulic equipment and especially mobile hydraulic equipment, it is often necessary and/or desirable to disengage the hydraulic motor from the mechanism it is driving so as to free wheel the mechanism. An example of this is a hydraulic motor which is connected to the wheels of a mining machine and used to propel the mining machine. When it becomes necessary to tow the mining machine the hydraulic motor must be disengaged from the drive train so the machine will roll freely. Another example is a scissor-lift used to load and unload aircraft. It is typically driven with a hydraulic motor connected to its drive train. When this vehicle requires towing, it is again necessary to disengage the motor from the drive train. Another example is a knuckle-boom loader which is used in the harvesting of timber. When it is in the woods, it is propelled by a hydraulic motor connected to its drive train. When it is transported to another job site, the hydraulic motor must be disconnected to allow the knuckle-boom loader to be towed.

Yet still another example is when a hydraulic motor is used to drive a winch. It is often necessary to disengage the motor in order to free wheel cable off the winch. Disengaging the hydraulic motor in the above examples is often accomplished by unbolting and physically removing the motor, building an elaborate slide which will slide the motor out of engagement, or using an expensive clutch between the motor and the drive train which can disengage the motor.

SUMMARY

The present invention is directed to a method and apparatus for disengaging and reengaging a hydraulic motor from the mechanism it is driving by retracting and extending the shaft of the hydraulic motor relative to the rotor for allowing the drive mechanism to rotate without being connected to the hydraulic motor.

One feature of the present invention is the method of disengaging a hydraulic motor having a stator, a rotor, and an output shaft longitudinally connected to a driven mechanism, by longitudinally moving the shaft relative to the rotor and retracting the shaft out of engagement with the driven mechanism for allowing the driven mechanism to rotate without interference from the hydraulic motor and in another embodiment, longitudinally moving the shaft, disconnects the shaft from the rotor again allowing the driven mechanism to freely rotate.

Still a further object of the present invention is the provision of a retractable shaft hydraulic motor having a rotor and a stator, a longitudinal shaft connected to the rotor in which the shaft is longitudinally movable relative to the rotor. Output connecting means are positioned on the shaft and are adapted to engage and drive a driven mechanism and means are connected to the shaft for longitudinally moving the shaft for disconnecting the drive mechanism from the rotor. The shaft may be connected to the rotor by longitudinally extending coacting splines and the output connecting means may be longitudinally extending splines. In one embodiment, the splines on the shaft are longer than the splines on the rotor for maintaining contact between the rotor and the shaft as the shaft is longitudinally moved.

Still a further object of the present invention is wherein the means for longitudinally moving the shaft includes a shaft extension connected to the shaft and extending out of the motor and a handle is provided on the extension for imparting longitudinal and rotational movement to the shaft for disengaging and reengaging the hydraulic motor with the driven mechanism.

Still a further object of the present invention is the provision of means yieldably urging the shaft into engagement with a driven mechanism.

A still further object of the present invention is wherein the means connected to the shaft for longitudinally moving the shaft retracts the output connecting means from the driven mechanism. And in another embodiment, the means connected to the shaft for longitudinally moving the shaft disconnects the shaft from the rotor.

Yet a still further object of the present invention is the provision of a rotatable shaft hydraulic motor having a housing, a rotor, and a stator, and an integral longitudinal shaft connected by coacting splines to the rotor and the shaft being longitudinally movable relative to the rotor. Non-rotatable and longitudinally engagable output connecting means are connected to the shaft and adapted to engage and drive a drive mechanism. Extension means are provided on the shaft extending out of the housing for longitudinally and rotatably moving the shaft for disconnecting and reconnecting the driven mechanism from and to the rotor.

Other and further objects, features and advantages will be apparent from the following description of presently preferred embodiments of the invention, given for the purpose of disclosure and taken in conjunction with the accompanying drawings.

DESCRIPTION OF THE PREFERRED EMBODIMENT

While the present invention will be described in its use with a vane-crossing-vane type hydraulic motor, for purposes of illustration only, the present invention is useful and may be used with other types of hydraulic motors having a rotating element and a stationary element hereinafter referred to as a rotor and a stator.

Figure 1:
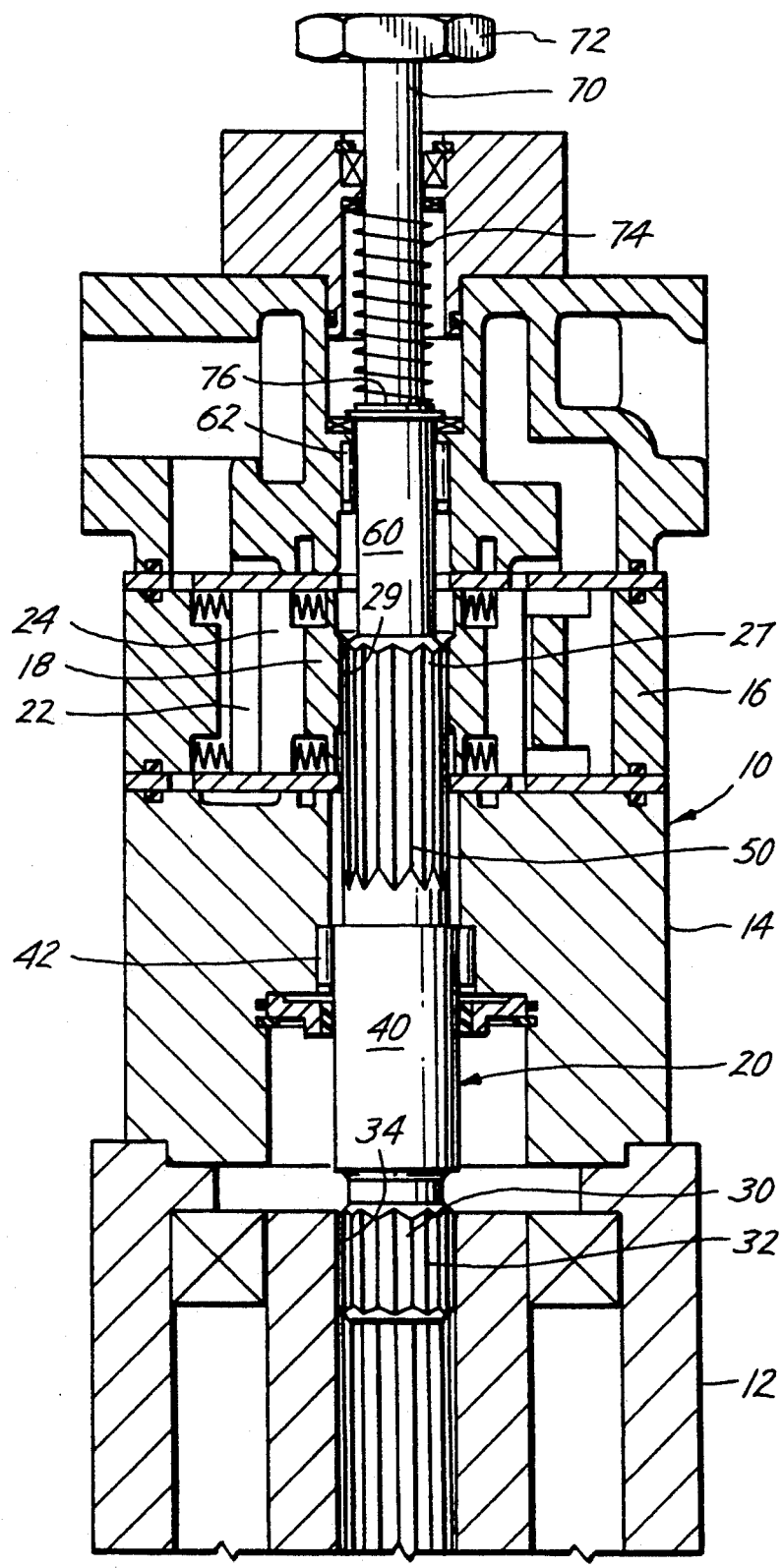
FIG. 1 is an elevational view, in cross section, of a hydraulic motor of the present invention engaging a mechanism which it is driving.

Referring now to the drawings, and particularly to FIG. 1, the reference numeral 10 generally indicates a hydraulic motor of the present invention rotatably driving a driven mechanism generally indicated by the reference numeral 12 which may be a drive train, a differential, a winch, or any other mechanism which will accept the rotational output from the motor 10.

The motor 10 generally includes a housing 14, a stator 16, a rotor 18, an output shaft 20. As disclosed in U.S. Pat. No. 4,599,058, the stator may include stator vanes 22 which are spring and hydraulically loaded and the rotor may include rotor vanes 24 which are also spring and hydraulic loaded. Generally, the construction of the vane type hydraulic motor 10 is somewhat similar to that described in U.S. Pat. No. 4,599,058, or similar to the 15 Series motor sold by Rineer Hydraulics, Inc.

Generally, the shaft 20 longitudinally extends through the axis of the motor 10 and is rotatably connected to the rotor 18 such as by coacting splines 27 and 29, respectively. Similarly, the output end 30 of the shaft 20 has a non-rotatable and longitudinal engagable connecting means adapted to engage and drive the driven mechanism 12. Normally, such connecting means are coacting splines 32 and 34 on the output end 30 and the driven mechanism 12, respectively.

However, as has been indicated, it is sometimes desirable to disengage the hydraulic motor 10 from the driven mechanism 12 in various applications as have been previously discussed. That is, it is desirable in some instances to disengage the hydraulic motor from the driven mechanism 12 to allow the mechanism 12 to rotate without interference from the hydraulic motor 10. In the past, this has been accomplished by physically moving the motor 10, building an elaborate slide which will slide the motor 10 out of engagement, or using an expensive clutch between the motor 10 and the driven mechanism 12.

The present invention is an improvement over the prior art by providing a longitudinally movable shaft 20 which is movable relative to the rotor 18, and means are provided connected to the shaft 20 for longitudinally moving the shaft for disconnecting the driven mechanism 12 from the rotor 18.

Figure 2:
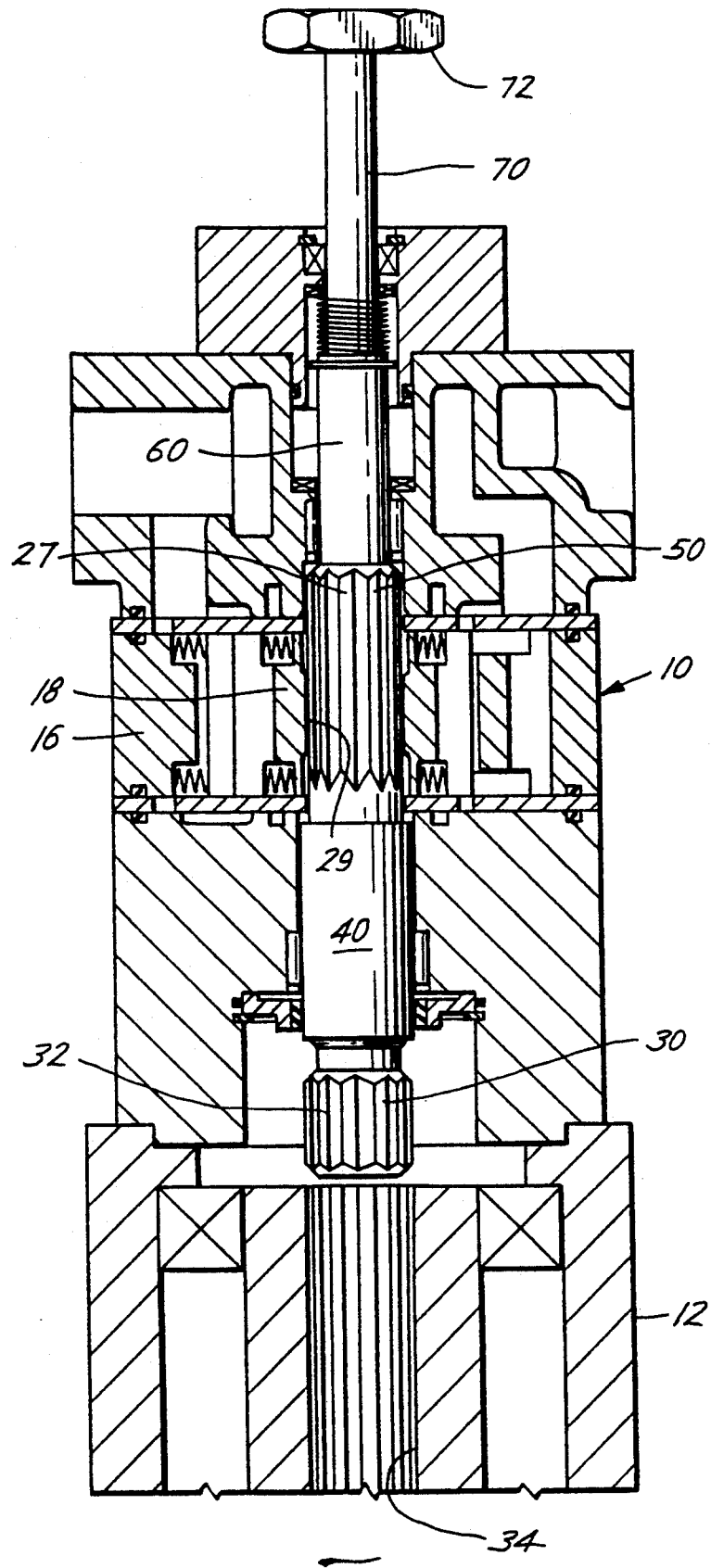
FIG. 2 is a view similar to FIG. 1, but with the hydraulic motor disengaged from the driven mechanism.

In the embodiment of FIGS. 1 and 2, the shaft 20 is an integral shaft consisting of an output end 30, a bearing section 40, an extended spline section 50, a second bearing section 60, an extension section 70, which may be connected to a handle 72. Pulling on the handle 72 retracts the shaft 20 moving the output end 30 out of engagement with the driven mechanism 12, as best seen in FIG. 2, thereby disengaging the hydraulic motor 10 from the driven mechanism 12. In this embodiment, the length of the bearing sections 40 and 60 are generally of an axial and longitudinal extent to remain in their bearings in both the engaged and the disengaged position. Thus, bearing section 40 remains in engagement with needle bearings 42 and bearing section 60 remains in engagement with needle bearings 62 in both the positions in FIGS. 1 and 2. Also, the longitudinal extent of the spline connections 27 on the spline section 50 are longer than the splines 29 on the rotor 18 whereby the rotor and shaft remain engaged in both the positions in FIGS. 1 and 2. When the handle is actuated to disengage the motor 10 from the driven mechanism 12, a variety of devices such as a block or a clip (not shown) may be inserted between the handle 12 and the housing 14 to maintain the disengagement of the motor 10 from the driven mechanism 12.

When it is desired to reengage the motor 10 and the driven mechanism 12, the block is removed, the handle 72 is pushed and rotated, if necessary, until the splines 32 on the output 30 line up with the coacting splines 34 on the driven mechanism 12, as best seen in FIG. 1. If desired, a spring 74 may be provided between the housing 14 and a shoulder 76 on the shaft 20 for yieldably urging and holding the shaft 20 in engagement with the driven mechanism 12. However, this is not generally necessary as the fluid pressure acting on the shaft 20 is generally sufficient to maintain engagement.

Figure 3:
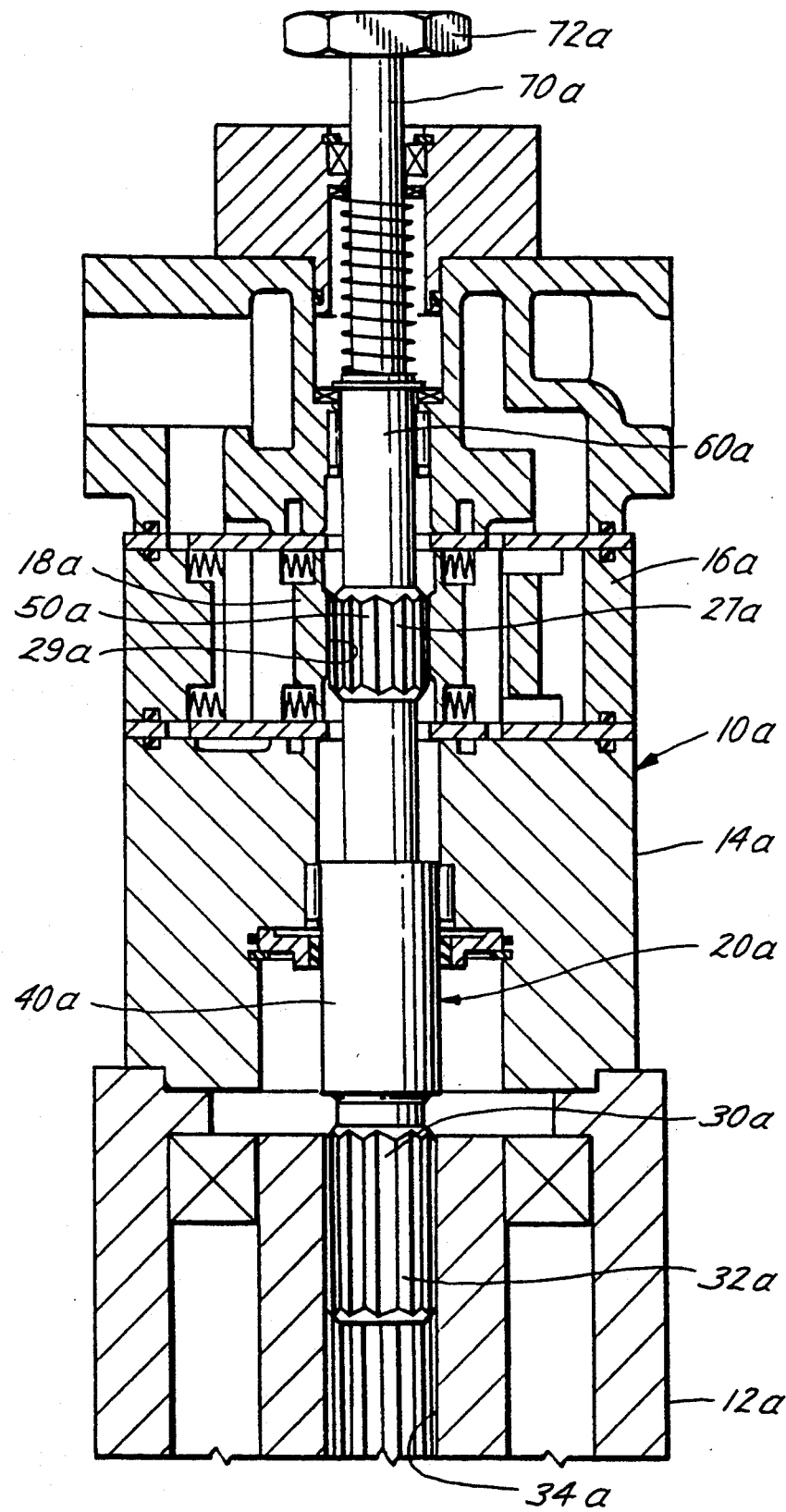
FIG. 3 is an elevational view, in cross section, illustrating another embodiment of the hydraulic motor of the present invention engaging a driven mechanism.
Figure 4:
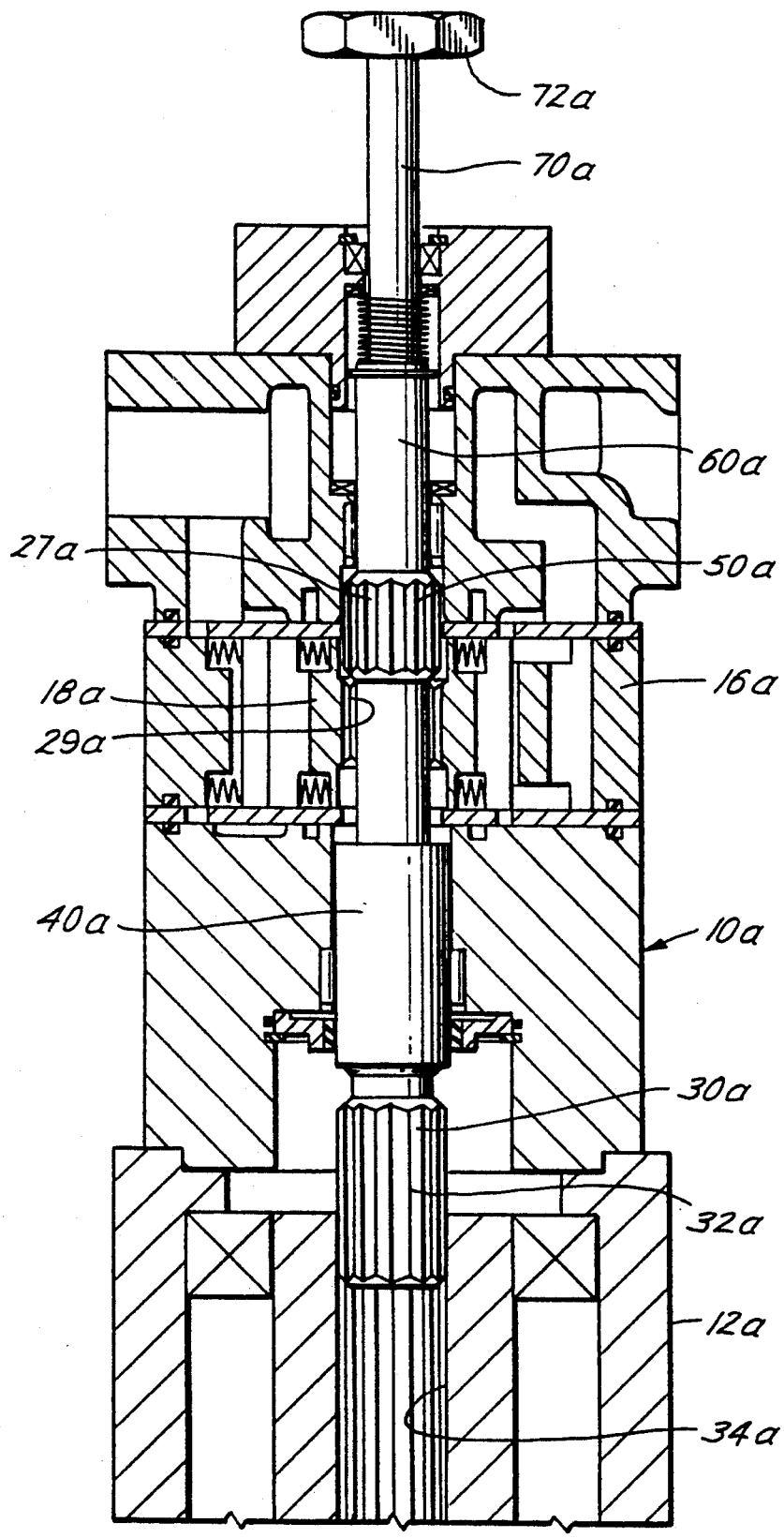
FIG. 4 is a view similar to FIG. 3 in which the hydraulic motor is disengaged from the driven mechanism.

Other and further embodiments may be provided, as hereinafter described, wherein like parts to those shown in FIGS. 1 and 2 will be similarly numbered with the addition of the suffix "a". In the embodiment of FIGS. 3 and 4, the longitudinal extent of the splines 27a on the spline section 50a of the shaft 20a is generally of the same extent as the coacting splines 29a on the rotor 18a. Therefore, longitudinal movement of the shaft 20a relative to the rotor 18a will cause disengagement between the splines 27a and 29a on the shaft 20a and the rotor 18a, respectively. This disengages the shaft 20a from the rotor 18a and thus effectively disconnects the driven mechanism 12a from the rotor 18a whether the output end 30a of the shaft 20a disengages from the driven mechanism 12a or not. As shown in FIG. 4, the axial extent of the output section 30a is greater than the axial extent of the spline section 50a of the shaft 20a and therefore the output end 30a need not be disconnected from the driven mechanism 12a. The disengagement and reengagement procedure of the embodiment shown in FIGS. 3 and 4 is similar to that of the embodiment in FIGS. 1 and 2. That is, the handle 72a of the shaft 70a is retracted to longitudinally move the shaft 20a relative to the rotor 18a and thereby disconnect the driven mechanism 12a from the rotor 18a. The motor 10a may be reengaged with the driven mechanism 12a by longitudinally extending the shaft 20a by actuation of the extension 70a, and if necessary rotating the extension 70a by the handle 72a to reengage the coacting spline connections 27a and 29a.

The present invention, therefore, is well adapted to carry out the objects and attain the ends and advantages mentioned as well as others inherent therein. While a presently preferred embodiment of the invention has been given for the purpose of disclosure, numerous changes in the details of construction, and arrangement of parts will be readily apparent to those skilled in the art and which are encompassed within the spirit of the invention and the scope of the appended claims.

What is claimed is:

1. A retractable shaft hydraulic motor comprising,
a hydraulic motor having a rotor and a stator,
a longitudinal shaft connected to the rotor, said shaft being longitudinally movable relative to the rotor,
output connecting means positioned on the shaft and adapted to engage and drive a driven mechanism, and
means connected to the shaft for longitudinally moving the shaft for disconnecting the driven mechanism from the rotor.

2. The motor of claim 1 wherein the shaft is connected to the rotor by longitudinally extending coacting splines.

3. The motor of claim 2 wherein the output connecting means are longitudinally extending splines.

4. The motor of claim 2 wherein the splines on the shaft are longer than the splines on the rotor for maintaining contact between the rotor and shaft as the shaft is longitudinally moved.

5. The motor of claim 2 wherein the means for longitudinally moving the shaft includes, a shaft extension connected to the shaft and extending out of the motor, and a handle on the extension for imparting longitudinal and rotational movement to the shaft.

6. The motor of claim 1 including, means yieldably urging said shaft into engagement with the driven mechanism.

7. The motor of claim 1 wherein the means connected to the shaft for longitudinally moving the shaft retracts the output connecting means from the driven mechanism.

8. The motor of claim 1 wherein the means connected to the shaft for longitudinally moving the shaft disconects the shaft from the rotor.

9. A retractable shaft hydraulic motor comprising, a hydraulic motor having a housing, a rotor and a stator, an integral longitudinal shaft connected by coacting splines to the rotor, said shaft being longitudinally movable relative to the rotor, rotatably and longitudinally engagable output connecting means connected to the shaft and adapted to engage and drive a driven mechanism, and extension means on the shaft extending out of the housing for longitudinally and rotatably moving the shaft for disconnecting and reconnecting the driven mechanism from and to the rotor.

10. A method of disengaging a hydraulic motor, having a stator, a rotor and an output shaft longitudinally connected to a driven mechanism comprising, longitudinally moving the shaft relative to the rotor for disconnecting the driven mechanism from the rotor.

11. A method of disengaging a hydraulic motor, having a stator, a rotor and an output shaft longitudinally connected to a driven mechanism comprising, longitudinally moving the shaft relative to the rotor and retracting the shaft out of engagement with the driven mechanism for allowing the driven mechanism to rotate without interference from the hydraulic motor.

12. The method of claim 10 including disconnecting the shaft from the rotor.

13. The motor of claim 1 wherein the shaft includes first, second and third sections, said second section connected to the rotor by longitudinally extending coacting splines, said first and third sections being supported by bearings, the longitudinal extent of the first and third sections being sufficient for maintaining contact of said first and third sections with said bearings as the shaft is longitudinally moved.

* * * * *